US012683954B2

(12) United States Patent
Kaidi

(10) Patent No.: US 12,683,954 B2
(45) Date of Patent: Jul. 14, 2026

(54) CENTRALIZED PROFILE FOR VERIFICATION WITHOUT COMPROMISE

(71) Applicant: PAYPAL, INC., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 237 days.

(21) Appl. No.: 18/511,008

(22) Filed: Nov. 16, 2023

(65) Prior Publication Data

US 2025/0168160 A1 May 22, 2025

(51) Int. Cl.
| | |
|---|---|
| *H04L 9/40* | (2022.01) |
| *G06F 21/30* | (2013.01) |
| *G06F 21/31* | (2013.01) |
| *G06F 21/32* | (2013.01) |
| *H04L 9/08* | (2006.01) |
| *H04L 9/14* | (2006.01) |
| *H04L 9/32* | (2006.01) |
| *H04L 29/00* | (2006.01) |
| *H04L 29/06* | (2006.01) |
| *H04L 67/06* | (2022.01) |

(52) U.S. Cl.
CPC ................................... *H04L 63/083* (2013.01)

(58) Field of Classification Search
CPC ...................................................... H04L 63/083
USPC .............................................................. 726/6
See application file for complete search history.

(56) References Cited

U.S. PATENT DOCUMENTS

| | | | | |
|---|---|---|---|---|
| 6,954,740 | B2 * | 10/2005 | Talker ................ | G06Q 20/3821 |
| | | | | 705/75 |
| 8,800,027 | B1 * | 8/2014 | Ackerman ............ | H04W 12/06 |
| | | | | 380/258 |
| 10,475,272 | B2 * | 11/2019 | Campero ............. | G06Q 20/363 |
| 11,736,473 | B2 * | 8/2023 | Kalantri ................. | H04L 67/06 |
| 2014/0007213 | A1 * | 1/2014 | Sanin ................... | H04L 63/0807 |
| | | | | 726/9 |
| 2014/0208119 | A1 * | 7/2014 | Chang ................. | H04L 63/0823 |
| | | | | 713/176 |
| 2016/0173483 | A1 * | 6/2016 | Wong ..................... | H04W 12/06 |
| | | | | 726/9 |
| 2018/0013565 | A1 * | 1/2018 | Fox ........................... | H04L 9/14 |
| 2018/0076962 | A1 * | 3/2018 | Campero ............. | G06Q 20/363 |
| 2019/0014127 | A1 * | 1/2019 | Zhao ..................... | H04L 63/123 |
| 2019/0020480 | A1 * | 1/2019 | Camenisch ........... | H04L 9/3263 |
| 2019/0036932 | A1 * | 1/2019 | Bathen ................ | H04L 63/0428 |
| 2019/0050438 | A1 * | 2/2019 | Fast ........................ | G06F 16/23 |

(Continued)

*Primary Examiner* — Berhanu Shitayewoldetadik
(74) *Attorney, Agent, or Firm* — Greenberg Traurig, LLP

(57) ABSTRACT

A system according to the present disclosure may include a processor, a centralized data warehouse, and a non-transitory computer readable medium storing thereon instructions that are executable by the processor to cause the system to perform operations. The operations may include receiving, from a user, identifying information, generating, based on the identifying information, a central profile for the user, generating, from the central profile, a first verification token configured to verify the user for a first service, and generating, from the central profile, a second verification token configured to verify the user for a second service. The first verification token and the second verification token are separately revocable and severable from the central profile, and neither the first verification token nor the second verification token comprise the identifying information of the user.

20 Claims, 5 Drawing Sheets

410 Receiving Request for Verifying User

420 Generating Verification Token Based on Stored Profile For User

430 Receiving Indication That Service is Compromised

440 Revoking Generated Verification Token in Response to Indication

450 Maintaining Other Verification Tokens in Response to Indication

400

(56)     References Cited

U.S. PATENT DOCUMENTS

| | | | | |
|---|---|---|---|---|
| 2019/0122220 | A1* | 4/2019 | Phillips | G06F 21/6218 |
| 2019/0207772 | A1* | 7/2019 | Hecht | H04L 63/10 |
| 2020/0050793 | A1* | 2/2020 | Roundtree | H04L 63/104 |
| 2020/0358777 | A1* | 11/2020 | Threlkeld | H04L 9/0643 |
| 2021/0150599 | A1* | 5/2021 | Kaja | G06Q 20/3672 |
| 2021/0258141 | A1* | 8/2021 | Moon | H04L 9/50 |
| 2021/0326432 | A1 | 10/2021 | Kaidi | |
| 2021/0367923 | A1 | 11/2021 | Kaidi | |
| 2021/0377254 | A1* | 12/2021 | Avetisov | H04L 67/133 |
| 2022/0255931 | A1* | 8/2022 | Avetisov | H04L 9/3247 |
| 2022/0271935 | A1* | 8/2022 | Bhasin | G06F 21/33 |
| 2023/0161976 | A1* | 5/2023 | Sazonova | G06N 5/025 |
| | | | | 704/2 |
| 2023/0185888 | A1* | 6/2023 | Singh | G06F 21/31 |
| | | | | 726/19 |
| 2023/0246839 | A1* | 8/2023 | Mathieu | H04L 9/3231 |
| 2023/0336364 | A1* | 10/2023 | Sloane | H04L 9/50 |
| 2024/0022562 | A1* | 1/2024 | Praszczalek | H04L 63/083 |
| 2024/0146730 | A1* | 5/2024 | Schneider | H04L 9/0833 |

* cited by examiner

CENTRALIZED PROFILE FOR VERIFICATION WITHOUT COMPROMISE

TECHNICAL FIELD

The instant disclosure relates to managing and providing a system for verifying users without exposing users to additional risk of compromise.

BACKGROUND

In order to maintain security, many applications require a prospective user to verify their identity prior to being granted access. This verification generally requires the prospective user to provide identifying information, that the application may then check against stored data to confirm the user.

DETAILED DESCRIPTION

Generally, computer-based applications require some amount of user verification in order to ensure a level of security. For example, if an application enables anyone with a computing device to access the application, said application potentially opens itself up to a high risk of abuse and/or compromise, which would necessarily worsen the application experience and may scare off legitimate users. A common form of user verification involves a prospective user opening an "account" with the application, which generally prompts the user to enter various details about themselves, such as an email address, a date of birth, a mailing address, etc. In some instances, particularly for those applications involving financial data, the prompted details may include a social security number and/or a banking account number. Once the user has opened an account, the user may receive access on future attempts with a unique username and password. However, by providing their identifying information in the first place, the user has potentially exposed themselves to additional risk, as a malicious actor who gains entrance to the application may now have the user's information. Furthermore, some users may use the same password across multiple applications to help them remember the passwords, such that compromise of one application may snowball into the compromise of multiple applications.

Accordingly, there is a need for a centralized system for managing verification that can grant a user access to a third-party application without requiring the user to expose their identifying information. This centralized system may receive, verify, and store user data in a single secure location, and may approve or facilitate user access to third party systems without causing any of the stored sensitive user data to be sent out of the centralized system. In particular, the centralized system may receive a request by a user or an application for the user to access the application, and may approve (e.g., verify) the user for the application without sending the application any of the user's information. Instead, the centralized system may send a certificate (e.g., token, code, string, etc.) to the application that attests to the user but does not actually include any of the user's data. In this way, if the application is subsequently compromised and a malicious actor gains access to the data of all registered users of the application, there are no data stored for this particular user.

Figure 1:
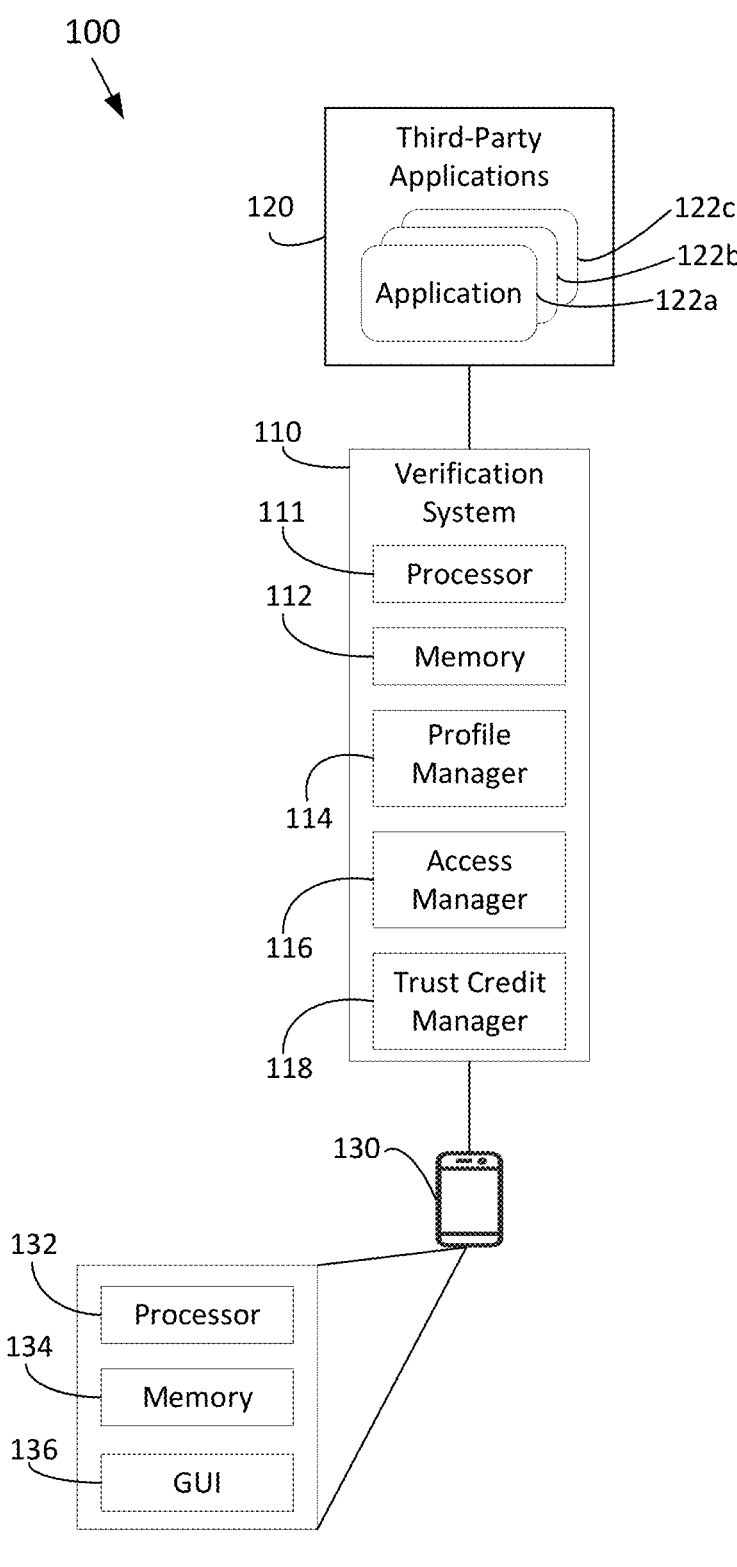
FIG. 1 is a block diagram of an example system for managing user access to third party applications without compromising user data or information.

Referring to the drawings, wherein like reference numerals refer to the same or similar features in the various views, FIG. 1 is a block diagram of an example system 100 for managing user access to third party applications without compromising user data or information. The system 100 may include a verification system 110, a group of third-party applications 120, and a user computing device 130. Each of the verification system 110, third-party applications 120, and the user computing device 130 may be in electronic communication with one another and/or with other components via a network. The network may include any suitable connection (or combinations of connections) for transmitting data to and from each of the components of the system, and may include one or more communication protocols that dictate and control the exchange of data.

As shown, the verification system 110 may include one or more functional modules 114, 116, and 118 embodied in hardware and/or software. In an embodiment, the functional modules 114, 116, and 118 of the verification system 110 may be embodied in a processor 111 and a memory 112 (i.e., a non-transitory, computer-readable medium) storing instructions that, when executed by the processor 111, cause the verification system 110 to perform the functionality of one or more of the functional modules 114, 116, and 118 and/or other functionality of this disclosure. For example, the verification system 110 may provide a graphical user interface (GUI) for the user device 130 that may enable the user to interact with one or more functions of verification system 110 and/or the third-party applications 120.

The third-party applications 120 may include multiple applications 122*a*, 122*b*, 122*c* (when referring to a single representative application, "application 122"), each of which may be any suitable computer- and/or mobile-based program and set of instructions that, when executed, cause the hosting device to perform a set of operations. For example, the applications 120 may be word processing programs, data management programs, web browsers, accounting software, etc. In order to access and/or use the applications 120, a user may first need to be verified or authenticated in order to keep out unauthorized and/or malicious actors. For example, an application 122 may require a user to create an account with certain identifying information, and the application 122 may require the user to log into this account for each use of the application 122. In another example, the application 122 may require the user to pay a fee to access the application 122, so the application 122 may first check to see if the user has paid said fee before allowing the user entry. In some embodiments, the application 122 may not be a computer application but may instead be a service, such as a car service, rental locker, or other electronically-facilitated transaction or exchange.

In some embodiments, the applications 120 may be accessed from the user device 130. For example, an application 122 may be a mobile-based application 122 saved in the memory 134 of the user device 130 and executed by the processor 132. In another example, a shortcut to access the application 122 via the network may be saved on the user device 130 and executed by the processor 132, while the application 122 itself may be hosted remotely.

The functional modules 114, 116, and 118 of the verification system 110 may include a profile manager 114 configured to receive data associated with a user and to generate a user profile based on the received data. The profile manager 114 may prompt the user for their data, and the user may provide the requested data in response, such that the data are received from the user via form, chart, or other similarly-organized format. This prompt may be presented on a GUI 136 of the user device 130. In this embodiment, the profile manager 114 may import the data directly into pre-defined categories (e.g., name, birthdate, Social Security Number (SSN), etc.). In other embodiments, the profile manager 114 may receive the user data in un-organized form (e.g., by extracting user data from user interactions, etc.), and the profile manager 114 may process the un-organized data to adapt the data to the pre-defined categories. The profile manager 114 may then store the generated user profile securely and with any suitable encryption.

The functional modules 114, 116, and 118 of the verification system 110 may include an access manager 116 configured to receive and process a request to verify a user for access to a third-party application, or to receive and process an indication of a compromised third-party application. The request to verify the user may come from the user (e.g., the user attempts to access application 122 by first accessing the verification system 110) or the request may come from the application 122 (e.g., the user attempts to access application 122, and the application 122 accesses the verification system 110 to facilitate the access). In response to the request, the access manager 116 may determine the amount of identifying information required to access the application 122, check the required amount against a stored profile (e.g., from profile manager 114) associated with the user, and selectively approve the request based on the check. For example, if the particular application 122 requires a user's birthdate, the access manager 116 may check that the stored profile associated with the user contains a birthdate and, in response to the profile having a birthdate, approve the request. In another example, if the particular application 122 requires a user's SSN and the stored profile associated with the user does not have the user's SSN, the access manager 116 may deny the access request.

Figure 2:
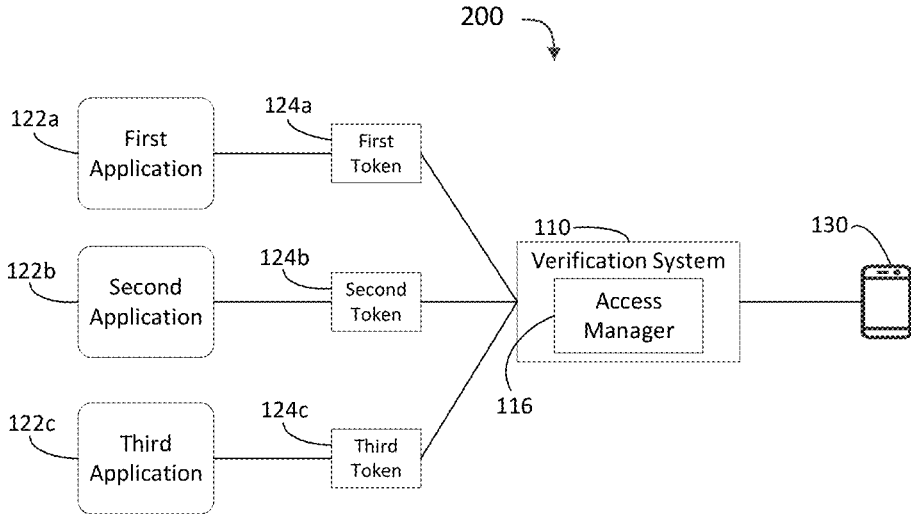
FIG. 2 is a block diagram of an example system for managing verification tokens via the system of FIG. 1.

The access manager 116 may approve access by issuing a verification token 124, as shown in FIG. 2. This verification token 124 may be unique to a particular application 122, such that each of the first application 122a, second application 122b, and third application 122c having a corresponding verification token 124—namely, first token 124a, second token 124b, and third token 124c, respectively. The verification token 124 may be a single datum (e.g., character string, numerical code, etc.) that may indicate to the application 122 to the associated user is approved for access. For example, in those embodiments in which the verification token 124 is distributed to the user for the user to present to the application 122, the token may only include a single digit (e.g., 0 or 1) indicative of a user's status. In those embodiments in which the verification token 124 is provided directly to the application 122, the verification token 124 may include an identifier for the associated user that is unique to the application 122, such that the application 122 may determine which user is associated with the token 124 in a way that does not affect the user's identifying information. In some embodiments, the verification token 124 may be encrypted.

The verification token 124 may omit (e.g., not include, intentionally disregard, obfuscate, etc.) identifying information for the user, such that the verification token 124 may serve as proof of the user's identity without including anything of the user's identify, other than a piece of identifying information that associates the token with a user (e.g., a username with the application 122, a randomly-assigned number then associated with the user for the application 122, etc.). Accordingly, the verification token 124 may enable a user to access the application 122 without sending their identifying information directly to the application 122, such their identifying information remains securely stored in the verification system 110.

Similarly to the initial access request, the indication of a compromise in the application 122 may come from the application 122 directly or from the affected user. In response to the indication, the access manager 116 may revoke or otherwise nullify the verification token 124. For example, the revocation may remove the verification token 124 from the application 122 (e.g., akin to un-sending an email) or, if the verification token 124 was provided directly to the user, from the user's wallet. In particular, the verification token 124 stored in a user's wallet may instead be a link to the verification token 124 or a visual representation of the verification token 124, such that the access manager 116 "revokes" the verification token 124 by disabling the link or visual representation.

In another example, the access manager 116 may revoke the verification token 124 by sending a notification to the application 122 that the verification token 124 is no longer valid. This notification may itself be a token, and may functionally replace the verification token 124 in the execution logic of the application 122. In this example, if the malicious actor who initially compromised the application 122 attempts to use the verification token 124 (or otherwise log in as the user), the application 122 may query for the related verification token and, instead, locate the revocation token.

The functional modules 114, 116, and 118 of the verification system 110 may include a trust credit manager 118 configured to distribute, track, and otherwise manage trust credits that serve to discourage malicious actors. A trust credit may be a form of currency established by the trust credit manager 118 (or the verification system 110 as a whole) that may set costs and values for actions within the verification system 110. In some embodiments, the trust credit may be pegged to a fiat currency, such that a certain number of trust credits may have an equivalent value of fiat currency, and/or may be purchased for some amount of fiat currency. In other embodiments, the trust credit may have a value only within the verification system 110, with trust credit awarded, distributed, or otherwise divested based on a user's actions within the verification system 110. For example, an amount of trust credits may be issued by the trust credit manager 118 in response to a successful log-in attempt by the user and/or in response to a password change by the user. Accordingly, the trust credit manager 118 may encourage desired user behavior by rewarding such behavior with trust credits.

The trust credit manager 118 may require payment (e.g., transfer, staking, exchange, etc.) of trust credits in order for a user to take certain actions. For example, the trust credit manager 118 may require a user to pay an amount of trust credits in order to submit a login attempt. Once the login attempt is successful, the trust credit manager 118 may refund (e.g., replace, return) the staked amount of trust credits and, in some embodiments, "pay" the user additional trust credits. Conversely, if the login attempt is unsuccessful, the trust credit manager 118 may retain (e.g., not refund) the stake amount of trust credits. Accordingly, unsuccessful login attempts may be punished or discouraged, which may have a chilling effect on malicious actors attempting to force entry. Although the "cost" of a single log-in attempt may be relatively low, malicious actors-particularly those attempting to "credential-stuff"-rely on an ability to try (and fail) repeatedly to log into a site. By attached a defined cost to these attempts, the verification system 110 may alter the cost-benefit analysis for such malicious actors. On the other hand, because the cost of the single log-in attempt may be relatively low, introducing such a "cost" to a standard user's experience would have a minimal effect, particularly if that cost may be immediately re-imbursed.

In some embodiments, the verification system 110 may store, track, or otherwise manage a single user profile that includes each of the functions described herein. For example, once a user registers themselves in the verification system 110, their associated profile may include their stored identifying information, their verification token(s) 124, and their trust credits. Accordingly, modules may work together and in synchronicity, with the trust credit manager 118 issuing trust credits based on profile activity from the profile manager 114, or the access manager 116 utilizing trust credits to authenticate a user.

FIG. 2 is a block diagram of an example system 200 for managing verification tokens 124 via the access manager 116 of the verification system 110. As shown, the system 200 includes the user device 130 in communication with the verification system 110. In turn, the verification system 110 (and, particularly, the access manager 116) may generate verification tokens 124 for use with various applications 120. In particular, the access manager 116 may generate a first token 124a for the first application 122a, a second token 124b for the second application 122b, and a third token 124c for the third application 122c. Notably, each of these verification tokens 124 may be managed separately from each other, such that decisions, changes, or compromises affecting one token (or one application corresponding to the token) may only affect said token.

For example, as described above with reference to the access manager 116, in response to receiving an indication that a particular application 122 has been compromised (e.g., hacked, breached, etc.), the access manager 116 may revoke the associated verification token 124. With reference now to FIG. 2, in an example in which the access manager 116 receives an indication that the second application 122b has been compromised, the access manager 116 may revoke (e.g., delete, nullify, etc.) the second token 124b, but may take no action (e.g., maintain as active) the first token 124a and the third token 124c. This is because each token 124 contains no identifying information of the user, so if a token (e.g., the second token 124b) is compromised and its contents are exposed to a malicious actor, no other token 124 is affected-either by direct action (e.g., revocation) from the access manager 116 or by the malicious actor.

Figure 3:
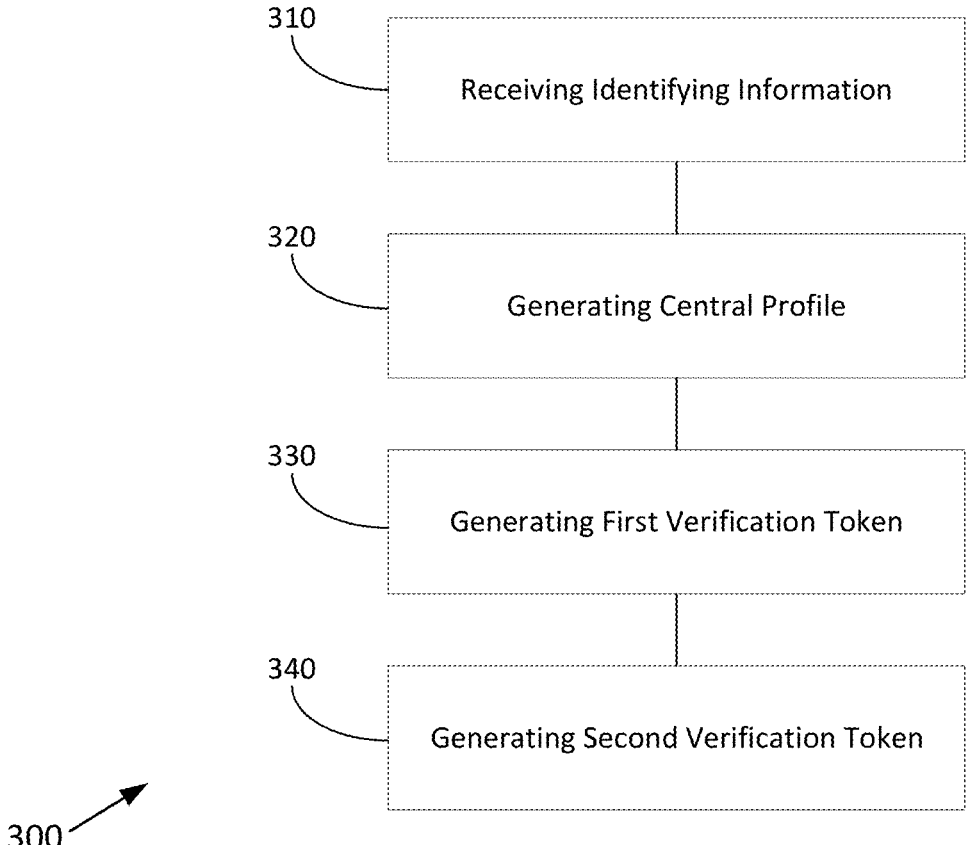
FIG. 3 is a flow chart illustrating an example method of facilitating access to third-party applications for a user involving the system of FIG. 1.

FIG. 3 is a flow chart illustrating an example method 300 of facilitating access to third-party applications for a user. The method 300, or one or more portions of the method 300, may be performed by system 100 and particularly the verification system 110 (shown in FIG. 1), in some embodiments.

The method 300 may include, at block 310, receiving identifying information from a user. As described above with reference to the profile manager 114, the verification system 110 may receive identifying information from the user in response to a prompt issued by the verification system 110 (e.g., to a GUI 136 of the user device 130). In some embodiments, particularly those in which the verification system 110 receives the information via a form, the identifying information may be pre-sorted or organized. In some embodiments, particularly those in which the verification system 110 receives the information via data-scraping or other collection methods, the identifying information may be unformatted or unorganized.

The method 300 may also include, at block 320, generating a central profile for the user based on the identifying information. As described above with reference to the profile manager 114, the verification system 110 may generate a profile by extracting data related to pre-determined categories from the received identifying information. For example, if the identifying information includes a birthdate of a user, the verification system 110 may extract the date and populate the 'birthdate' category of the user's central profile with the extracted date.

In those embodiments in which the user from whom the identifying information was received already has a central profile, the method 300, at block 320, may instead update the central profile with any received information either different from or not included in the previously-stored central profile. For example, if the received identifying information includes a different home address than the previously-generated central profile, the verification system 110 may revise the 'home address' category of the profile to be the new address.

The method 300 may further include, at block 330, generating a first verification token configured to verify the user for a first service (e.g., application). As described above with reference to the access manager 116, the first verification token (e.g., first token 124a) may be a single datum (e.g., character string, numerical code, etc.) that may indicate to the application 122 to the associated user is approved for access. The first verification token may not include any identifying information of the user, and may instead serve as proof (e.g., or as a guarantee by the verification system 110) that the user is who they say they are. In some embodiments, the first verification token may include an identifier for the associated user that is unique to the application, such that the application may determine which user is associated with the token in a way that does not affect the user's identifying information.

The method 300 may further include, at block 340, generating a second verification token configured to verify the user for a second service (e.g., application). Similar to the first verification token, the second verification token (e.g., second token 124b) may omit any identifying information about the user. Because the first verification token and the second verification token may be configured to authenticate the user for different services (e.g., applications), the two tokens may be treated entirely independent of each other.

Figure 4:
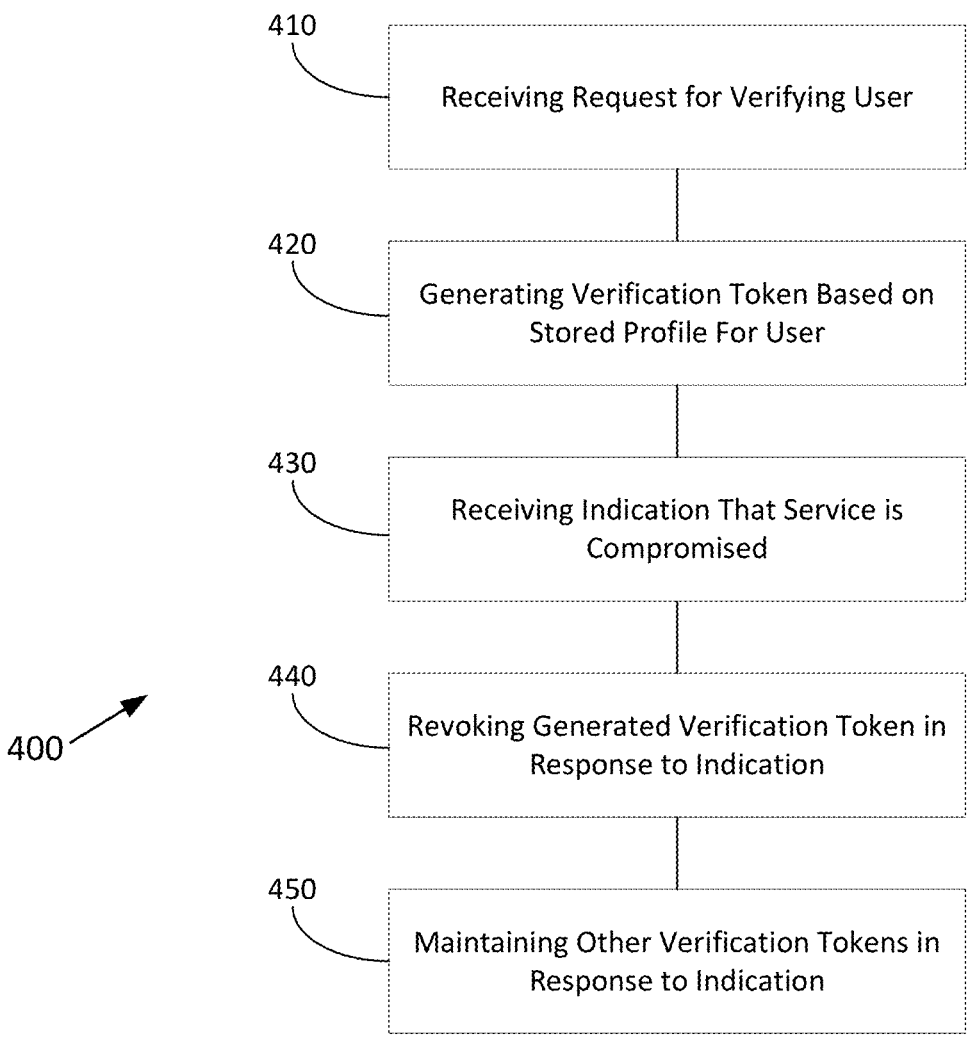
FIG. 4 is a flow chart illustrating an example method of facilitating access to third-party applications for a user involving the system of FIG. 1.

FIG. 4 is a flow chart illustrating an example method 400 of facilitating access to third-party applications for a user. The method 400, or one or more portions of the method 400, may be performed by system 100 and particularly the verification system 110 (shown in FIG. 1), in some embodiments.

The method 400 may include, at block 410, receiving a request to verify a user for a service. As described above with reference to the access manager 116, the request may come directly from the user, or may come from the service that the user is attempting to access. The request may specify a user requesting access, and may include an amount or type of identifying information required to grant the user access.

The method 400 may also include, at block 420, generating a verification token based on a stored profile for the user. The verification, as discussed above, may not include any actual identifying information, and may instead serve as proof that the user is who they say they are. The verification system 110 may generate the verification token in response to checking that the stored profile for the user does, in fact, contain the information required for access by the service, such that the verification token may symbolize, to the service, that the user has given the required information to the verification system.

The method 400 may further include, at block 430, receiving an indication that the service is compromised. As described above with reference to the access manager 116, the indication of compromise may come directly from the compromised service or may come from the user. In embodiments in which the service is a website-based internet service that requires a user to create an account with the service, the indicated compromise may include a security breach at the website (or at servers hosting the website). The website may then release a general notification (e.g., via email to its account holders) notifying the users of the breach, or the breach may be detected by a third-party monitoring service (e.g., credit monitoring bureau) that detects presence of a leaked email address. In embodiments in which the service is a payment processing service, the indicated compromise may be an unauthorized export of a transaction ledger (e.g., list of payments processed by the service). The service itself may indicate the compromise by issuing a general notification to the banks associated with the payment methods.

The method 400 may also include, at block 440, revoking the generated verification token in response to the indication. As described above, the verification system 110 may revoke the verification token by rescinding the token, by nullifying the token, by superseding the token in storage, or by removing access to the token itself. For example, if the verification token is configured to grant a user access to the service when the user presents the verification token, the revocation at block 440 may include appending metadata to the verification token that indicates a revoked status. When the user then tries to present the verification token to the service, the service may interpret the appended metadata and, in response, deny the user access. In those embodiments in which the verification token is sent to the service directly by the verification system, the revocation at block 440 may include the verification system sending a subsequent message to the service that instructs the service to delete or otherwise remove the verification token from the service.

The method 400 may further include, at block 450, maintaining other verification tokens in response to the indication. As described in depth above, each verification token may exist and be managed separately from the other tokens. Accordingly, a compromise (and subsequent revocation) may only affect a single token, such that the other tokens generated by the verification system 110 for other services and applications may remain active.

Figure 5:
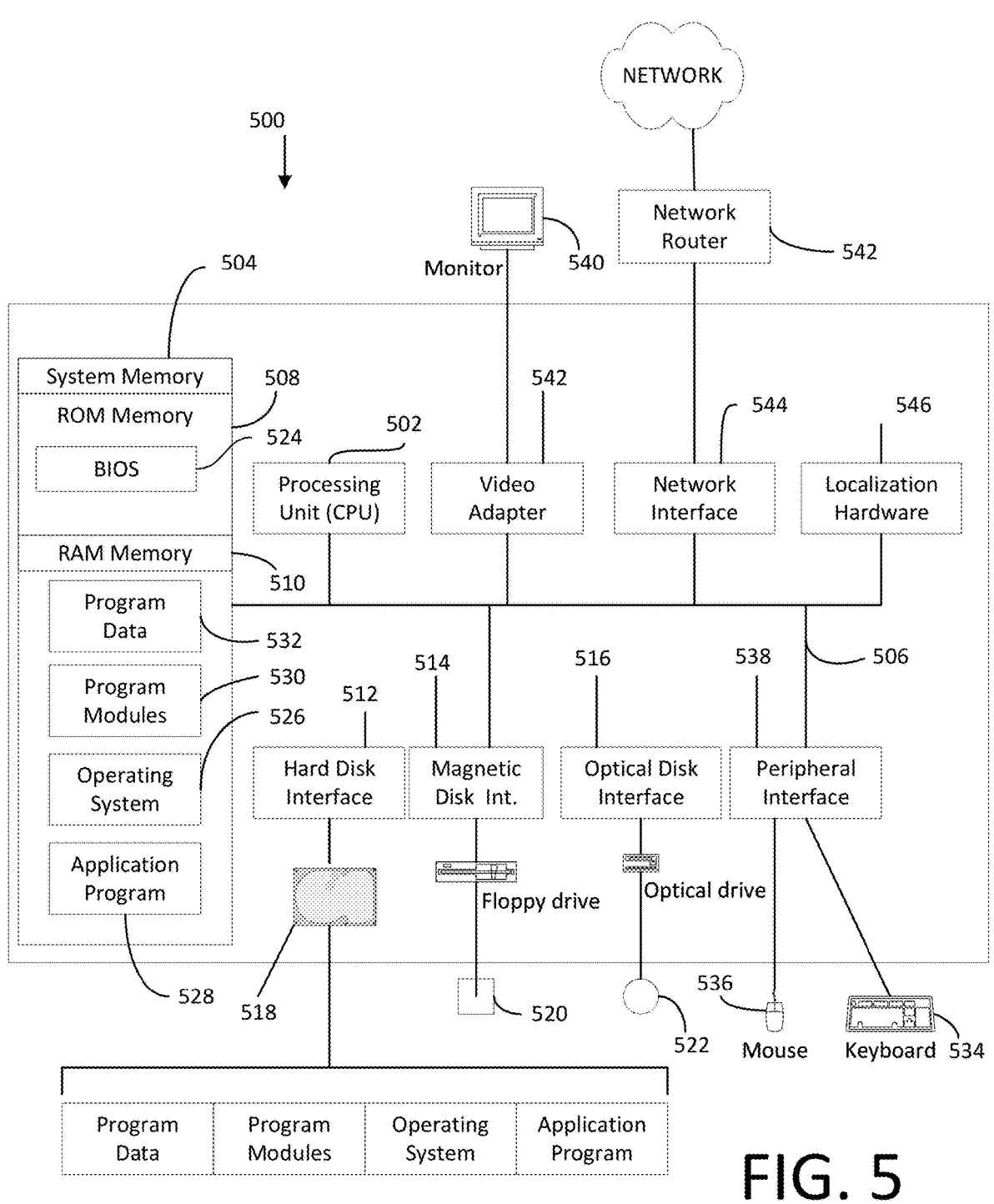
FIG. 5 is a diagrammatic view of an example embodiment of a user computing environment for the system of FIG. 1.

FIG. 5 is a diagrammatic view of an example embodiment of a user computing environment that includes a computing system environment 500, such as a desktop computer, laptop, smartphone, tablet, or any other such device having the ability to execute instructions, such as those stored within a non-transient, computer-readable medium. For example, the computing system environment 500 may be the user device 160 or a system hosting the policy system 110. In another example, one or more components of the computing system environment 500, such as one or more CPUs 502, RAM memory 510, network interface 544, and one or more hard disks 518 or other storage devices, such as SSD or other FLASH storage, may be included in the event system 110. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 500 typically includes at least one processing unit 502 (e.g., processor 111) and at least one memory 504 (e.g., memory 112), which may be linked via a bus. Depending on the exact configuration and type of computing system environment, memory 504 may be volatile (such as RAM 510), non-volatile (such as ROM 508, flash memory, etc.) or some combination of the two. Computing system environment 500 may have additional features and/or functionality. For example, computing system environment 500 may also include additional storage (removable and/or non-removable) including, but not limited to, magnetic or optical disks, tape drives and/or flash drives. Such additional memory devices may be made accessible to the computing system environment 500 by means of, for example, a hard disk drive interface 512, a magnetic disk drive interface 514, and/or an optical disk drive interface 516. As will be understood, these devices, which would be linked to the system bus, respectively, allow for reading from and writing to a hard disk 518, reading from or writing to a removable magnetic disk 520, and/or for reading from or writing to a removable optical disk 522, such as a CD/DVD ROM or other optical media. The drive interfaces and their associated computer-readable media allow for the nonvolatile storage of computer readable instructions, data structures, program modules and other data for the computing system environment 500. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 500.

A number of program modules may be stored in one or more of the memory/media devices. For example, a basic input/output system (BIOS) 524, containing the basic routines that help to transfer information between elements within the computing system environment 500, such as during start-up, may be stored in ROM 508. Similarly, RAM 510, hard disk 518, and/or peripheral memory devices may be used to store computer executable instructions comprising an operating system 526, one or more applications programs 528 (which may include the functionality of the policy system 110 of FIG. 1 or one or more of its functional modules 114, 116, and 118, for example), other program modules 530, and/or program data 532. Still further, computer-executable instructions may be downloaded to the computing environment 500 as needed, for example, via a network connection.

An end-user may enter commands and information into the computing system environment 500 through input devices such as a keyboard 534 and/or a pointing device 536. While not illustrated, other input devices may include a microphone, a joystick, a game pad, a scanner, etc. These and other input devices would typically be connected to the processing unit 502 by means of a peripheral interface 538 which, in turn, would be coupled to bus. Input devices may be directly or indirectly connected to processor 502 via interfaces such as, for example, a parallel port, game port, firewire, or a universal serial bus (USB). To view information from the computing system environment 500, a monitor 540 or other type of display device may also be connected to bus via an interface, such as via video adapter 542. In addition to the monitor 540, the computing system environment 500 may also include other peripheral output devices, not shown, such as speakers and printers.

The computing system environment 500 may also utilize logical connections to one or more computing system environments. Communications between the computing system environment 500 and the remote computing system environment may be exchanged via a further processing device, such a network router 542, that is responsible for network routing. Communications with the network router 542 may be performed via a network interface component 544. Thus, within such a networked environment, e.g., the Internet, World Wide Web, LAN, or other like type of wired or wireless network, it will be appreciated that program modules depicted relative to the computing system environment 500, or portions thereof, may be stored in the memory storage device(s) of the computing system environment 500.

The computing system environment 500 may also include localization hardware 556 for determining a location of the computing system environment 500. In embodiments, the localization hardware 556 may include, for example only, a GPS antenna, an RFID chip or reader, a WiFi antenna, or other computing hardware that may be used to capture or transmit signals that may be used to determine the location of the computing system environment 500.

In some embodiments, a system may include a processor, and a non-transitory computer readable medium stored thereon instructions that are executable by the processor to cause the system to perform operations may include receiving, from a user, identifying information, generating, based on the identifying information, a central profile for the user, generating, from the central profile, a first verification token (e.g., first token 124a) configured to verify the user for a first service (e.g., first application 122a), and generating, from the central profile, a second verification token (e.g., second token 124b) configured to verify the user for a second service (e.g., second application 122b). The first verification token and the second verification token may be separately revokable and severable from the central profile, and neither the first verification token nor the second verification token may include the identifying information of the user.

In some of these embodiments, the operations may further include receiving an indication that the first verification token may be compromised, and in response to the indication, revoking the first verification token. The second verification token may be unaffected by the revocation of the first verification token. In some of these embodiments, the first service includes a mobile application, and the second service includes a physical storage locker.

In some of these embodiments, the operations may further include generating, from the central profile, in response to the indication that the first verification token may be compromised, a third verification token configured to verify the user for the first service, the third verification token different from the first verification token. In this manner, the user may continue to access the first service substantially uninterrupted while remaining protected. In some of these embodiments, the indication that the first verification token may be compromised may be received from at least one of the first service or the user.

In some of these embodiments, the generation of the first verification token may be based on a first minimum requirement of the first service for verifying the user, and wherein the generation of the second verification token may be based on a second minimum requirement of the second service for verifying the user. In this manner, each token may be generated differently (and separately) from the other.

In some embodiments, a computer-implemented method may include receiving, from a service (e.g., application 122), a request for verifying a user, generating, in response to the request and based on a stored profile for the user, a verification token (e.g., verification token 124) configured to verify the user for the service, the verification token omitting identifying information of the user, receiving an indication that the service may be compromised, and in response to the indication, revoking the generated verification token to insulate the stored profile from the compromised service.

In some of these embodiments, the revocation of the generated verification token prevents a third party who compromised the included service from accessing the stored profile for the user. In some of these embodiments, the method may further include generating, in response to the revocation, a second verification token (e.g., second verification token 124b) configured to verify the user for the service, the second verification token different from the revoked verification token.

In some of these embodiments, the request from the service includes an amount of information required by the service, and the generation of the verification token may be based on the amount of information. For example, if the service requires a user's birthday and mailing address, the system may generate a token that specifically indicates to the service that the system has confirmed the user's birthday and mailing address.

In some of these embodiments, the service may include a first service, the request includes a first request, and the verification token includes a first verification token. The method may further include receiving, from a second service, a second request to verify the user, and generating, in response to the request and based on the stored profile for the user, a second verification token configured to verify the user for the second service, the second verification token omitting identifying information of the user, and the second verification token may be different from the first verification token. Accordingly, verification tokens may be generated for separate services without affecting those generated previously—in contrast to a situation in which a breach at one service requires a user to change their passwords for all services.

In some of these embodiments, the method may further include receiving an indication that the first service may be compromised, in response to the indication, revoking the first verification token, and in response to the indication, maintaining the second verification token as active. Accordingly, each token is managed separately.

In some of these embodiments, revoking the first verification token may include sending, to the user, a notification that the first verification token may be invalid, and removing the first verification token from a wallet of the user, and maintaining the second verification token as active may include not sending, to the user, a notification that the second verification token may be invalid, and not removing the second verification token from the wallet of the user.

In some embodiments, a computer-implemented method may include receiving, from a user, verification information, establishing, based on the verification information, a centralized verification profile, providing, to the user, a verification code configured to provide the user access to an application, receiving an indication that the application may be compromised, and in response to the indication, automatically revoking the verification code. In some of these embodiments, the verification code may not include any of the received verification information.

In some of these embodiments, the method may further include in response to the indication, providing, to the user, a second verification code configured to provide the user access to the application. The second verification code may be different from the revoked verification code, in order to maintain the user's access to the service. In some of these embodiments, the indication may be received from the application.

In some of these embodiments, the verification code may include a first verification code, and the application includes a first application, and the method may further include providing, to the user, a second verification code configured to provide the user access to a second application, and in response to the indication that the first application may be compromised, maintaining the second verification code as active.

In some of these embodiments, the first verification code may be based on a first minimum requirement for accessing the first application, and the second verification code may be based on a second minimum requirement for accessing the second application, the first minimum requirement being different from the second minimum requirement. In some of these embodiments, the verification code may be configured to provide proof of the user's identity via a public key of the user.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A system comprising:

a processor; and a non-transitory computer readable medium stored thereon instructions that are executable by the processor to cause the system to perform operations comprising:

receiving, from a user, identifying information input onto a user interface displayed at a user device by the system;

generating, based on the identifying information, a central profile for the user;

responsive to a first request to verify the user for a first service, generating, from the central profile, a first verification token configured to verify the user for the first service; and responsive to a second request to verify the user for a second service, generating, from the central profile, a second verification token configured to verify the user for the second service;

wherein:

the first request is independent of the second request, the first verification token and the second verification token are separately revokable and severable from the central profile, neither the first verification token nor the second verification token comprises the identifying information of the user, neither the first service nor the second service comprises the identifying information of the user, and the first service or the second service being compromised does not expose the identifying information of the user.

2. The system of claim 1, wherein the operations further comprise:

receiving an indication that the first verification token is compromised; and in response to the indication, revoking the first verification token, wherein the second verification token is unaffected by the revocation of the first verification token.

3. The system of claim 2, wherein the operations further comprise:

generating, from the central profile, in response to the indication that the first verification token is compromised, a third verification token configured to verify the user for the first service, the third verification token different from the first verification token.

4. The system of claim 2, wherein the indication that the first verification token is compromised is received from at least one of the first service or the user.

5. The system of claim 1, wherein the first service comprises a mobile application, and the second service comprises a physical storage locker.

6. The system of claim 1, wherein the generation of the first verification token is based on a first minimum requirement of the first service for verifying the user, and wherein the generation of the second verification token is based on a second minimum requirement of the second service for verifying the user.

7. A computer-implemented method comprising:

receiving, from a service, a request for verifying a user;

generating, in response to the request and based on a stored profile for the user, a verification token configured to verify the user for the service, the verification token omitting identifying information of the user;

receiving an indication that the service is compromised; and in response to the indication, revoking the generated verification token to insulate the stored profile from the compromised service, wherein the service does not store the identifying information of the user such that the service being compromised does not expose the identifying information of the user.

8. The method of claim 7, wherein the revocation of the generated verification token prevents a third party who compromised the comprised service from accessing the stored profile for the user.

9. The method of claim 7, further comprising generating, in response to the revocation, a second verification token configured to verify the user for the service, the second verification token different from the revoked verification token.

10. The method of claim 7, wherein:

the request from the service comprises an amount of information required by the service, and the generation of the verification token is based on the amount of information.

11. The method of claim 7, wherein:

the service comprises a first service, the request comprises a first request, and the verification token comprises a first verification token;

the method further comprises:

receiving, from a second service, a second request to verify the user; and generating, in response to the request and based on the stored profile for the user, a second verification token configured to verify the user for the second service, the second verification token omitting identifying information of the user, and the second verification token is different from the first verification token.

12. The method of claim 11, further comprising:

receiving an indication that the first service is compromised;

in response to the indication, revoking the first verification token; and in response to the indication, maintaining the second verification token as active.

13. The method of claim 12, wherein:

revoking the first verification token comprises:

sending, to the user, a notification that the first verification token is invalid; and removing the first verification token from a wallet of the user, and maintaining the second verification token as active comprises:

not sending, to the user, a notification that the second verification token is invalid; and not removing the second verification token from the wallet of the user.

14. A computer-implemented method comprising:

receiving, from a user, verification information, the verification information input by the user onto a user interface prompted by a verification system;

establishing, based on the verification information, a centralized verification profile in the verification system;

providing, to the user, a verification code configured to provide the user access to an application;

receiving an indication that the application is compromised; and in response to the indication, automatically revoking the verification code, wherein the application does not store identifying information of the user and the verification code omits identifying information of the user such that the application being compromised does not expose the identifying information of the user.

15. The method of claim 14, wherein the verification code does not comprise any of the received verification information.

16. The method of claim 14, further comprising:

in response to the indication, providing, to the user, a second verification code configured to provide the user access to the application, wherein the second verification code is different from the revoked verification code.

17. The method of claim 14, wherein the indication is received from the application.

18. The method of claim 14, wherein:

the verification code comprises a first verification code, and the application comprises a first application, and the method further comprises:

providing, to the user, a second verification code configured to provide the user access to a second application; and in response to the indication that the first application is compromised, maintaining the second verification code as active.

19. The method of claim 18, wherein the first verification code is based on a first minimum requirement for accessing the first application, and the second verification code is based on a second minimum requirement for accessing the second application, the first minimum requirement being different from the second minimum requirement.

20. The method of claim 14, wherein the verification code is configured to provide proof of the user's identity via a public key of the user.

* * * * *